Figure 1:
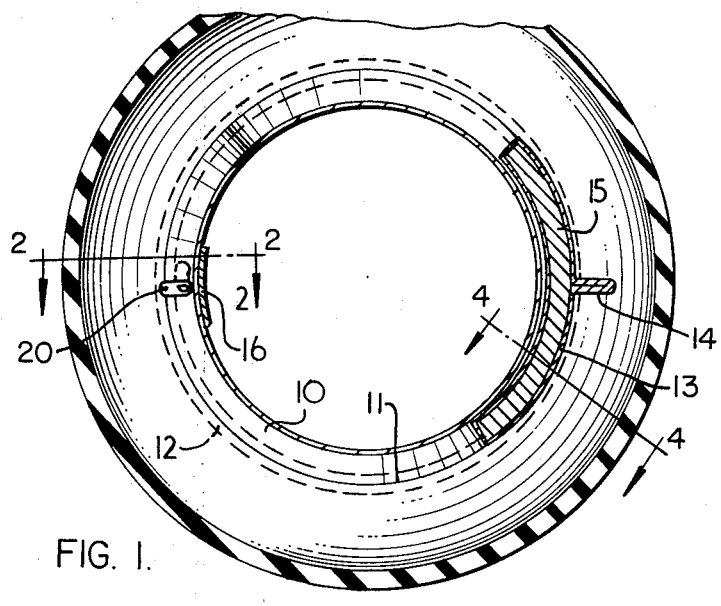

United States Patent [19]
Edwards

[11] 3,930,526
[45] Jan. 6, 1976

[54] PNEUMATIC TIRE AND WHEEL ASSEMBLIES

[75] Inventor: Reginald Harold Edwards, Sutton Coldfield, England

[73] Assignee: Dunlop Limited, London, England

[22] Filed: Dec. 14, 1972

[21] Appl. No.: 314,987

[30] Foreign Application Priority Data
Dec. 22, 1971 United Kingdom............... 59776/71

[52] U.S. Cl. ............ 152/330 L; 152/346; 301/5 BA
[51] Int. Cl.² ............................................. B60C 5/00
[58] Field of Search .... 301/5 B, 5 BA; 152/330 RF, 152/330 R, 346, 347, DIG. 5, 330 L

[56] References Cited
UNITED STATES PATENTS

| | | |
|---|---|---|
| 1,359,461 | 11/1920 | French et al. .................. 152/330 L |
| 2,045,341 | 6/1936 | Bourjon ............................... 152/158 |
| 3,143,155 | 8/1965 | Knox ................................. 152/330 R |
| 3,208,497 | 9/1965 | Schutt................................. 152/415 |
| 3,299,934 | 1/1967 | Pace .................................... 152/354 |
| 3,444,918 | 5/1969 | Goggins .............................. 152/347 |
| 3,739,829 | 6/1973 | Powell et al. ....................... 152/330 |

*Primary Examiner*—M. Henson Wood, Jr.
*Assistant Examiner*—Richard A. Bertsch
*Attorney, Agent, or Firm*—Stevens, Davis, Miller & Mosher

[57] ABSTRACT

A pneumatic tire and wheel assembly comprises an enclosing means for a lubricating material which releases the lubricating material into the tire when the tire becomes deflated. A counterbalancing mass counterbalances the mass of the enclosing means and the lubricating material so that when the lubricating material is released the assembly becomes out-of-balance, of which the following is a specification.

21 Claims, 5 Drawing Figures

PNEUMATIC TIRE AND WHEEL ASSEMBLIES

This invention relates to pneumatic tires and wheel assemblies and is an improvement in or modification of the invention described in the assignee's co-pending application 150,627 of June 7, 1971, the disclosure of which is hereby incorporated by reference. That application is directed to a tire and wheel combination which will operate successfully in a deflated condition, having a wheel rim with no well into which the tire bead can drop to dislodge the wheel when running deflated. To prevent overheating when running deflated, due to friction between contacting interior surfaces the prior application utilizes a lubricant which is held until needed in an enclosing means which preferably extends around the entire circumference of the tire or wheel. This combination works so successfully that it is sometimes difficult for a driver to realize he has a flat tire. A disadvantage of the prior construction is the difficulty in installing a new tire on the well-less wheel.

The present invention overcomes these disadvantages by locating the lubricant enclosing means in one circumferential sector of the tire and a counterweight in an opposite sector so that when the lubricant is released from the enclosing means and distributed around the interior of the tire due to centrifugal force, the counterweight will then throw the tire out of balance. A wheel rim with a well is preferably used to facilitate tire changes but a means is provided to prevent the tire beads from falling into the well when driving deflated. The well conveniently provides a location for the lubricant means.

According to the present invention a pneumatic tire and wheel assembly comprises a tire mounted on a wheel to define therewith an inflation chamber, an enclosing means for a lubricating material for the interior surface of the tire, the lubricating material being releasable from the enclosing means into the inflation chamber upon substantial loss of inflation pressure or deflation of the tire, the mass of the enclosing means and lubricating material being counterbalanced in the assembly by a counterbalancing mass whereby on release of the lubricating material the assembly becomes out-of-balance.

As described in application 150,627 the enclosing means may have a frangible closure member which is ruptured to effect release of the lubricating material, for example a frangible diaphragm or projection adapted to be ruptured by collapse of a tire on the wheel rim upon deflation. Alternatively the enclosing means may have a pressure sensitive valve responsive to a decrease in pressure within the inflation chamber below a predetermined value to effect release of the lubricating material.

Generally, the rim of the wheel has a well in which the enclosing means is located. The enclosing means preferably comprises at least one container having an arcuate form in longitudinal section and dimensioned in cross-section to fit into the well. The radially inner curvature of each container preferably matches the external curvature of the base of the well of the wheel rim for which the container is designed.

The container may be wholly or partly rigid, e.g. of plastics material or metal, and is generally provided with a rigid base which preferably extends radially outwardly beyond the well of the wheel rim to act as a spacer to prevent the tire beads from being displaced axially inwardly into the well.

The container may be formed integrally with the well of the wheel rim and provided with a replaceable lubricant release means or may be detachable and simply located in the wheel, for example, by means of a bolt attached to the container base passing through a hole in the rim well and a nut and sealing rim to sealingly fix the container on the rim.

Preferably the or all the containers are located within an arc of the circumference of the wheel less than one third of the total circumference of the wheel. Provided that the container or containers do not occupy an arc of more than about one third of the rim well, depending upon the radial height of the container ends, a tire may be mounted on the wheel rim with the container in position.

If desired, one or more tire bead retaining members may then be provided elsewhere on the wheel rim to prevent axial displacement of a tire bead into the well of the wheel rim after the tire has been mounted on the wheel rim. The tire bead retaining member may take the form of a movable projection on the wheel rim or a movable plate on the side of the well which may be raised to prevent displacement of the bead after the tire has been mounted on the wheel rim. One or more tire bead retaining members may be provided only for the outboard bead seat on the wheel rim or for outboard and inboard bead seats. It is preferred to locate at least one tire bead retaining member diametrically opposite the enclosing means to prevent axial displacement of at least the laterally outer bead into the well of the wheel rim.

The invention also provides a wheel suitable for use in a pneumatic tire and wheel assembly comprising a wellbase rim having positioned in said well a container for lubricating material provided with means for releasing the lubricating material, the container being located within an arc on the circumference of the wheel no greater than ⅓ of the total circumference.

The invention also provides a container for lubricating material for the interior surfaces of a tire comprising means for releasing the lubricating material into the interior of a pneumatic tire and wheel assembly in which the container is located when in use, upon substantial loss of inflation pressure from said assembly, the container having an arcuate form in longitudinal section and being dimensioned in cross section to fit into the well of a well-based wheel rim.

The invention will now be described, by way of example only, with reference to the accompanying drawings in which:

FIG. 1 is a section through the center of the well of a wheel rim and tire showing a lubricant container and bead lock in position. The tire center of the wheel are omitted for clarity.

Figure 2:
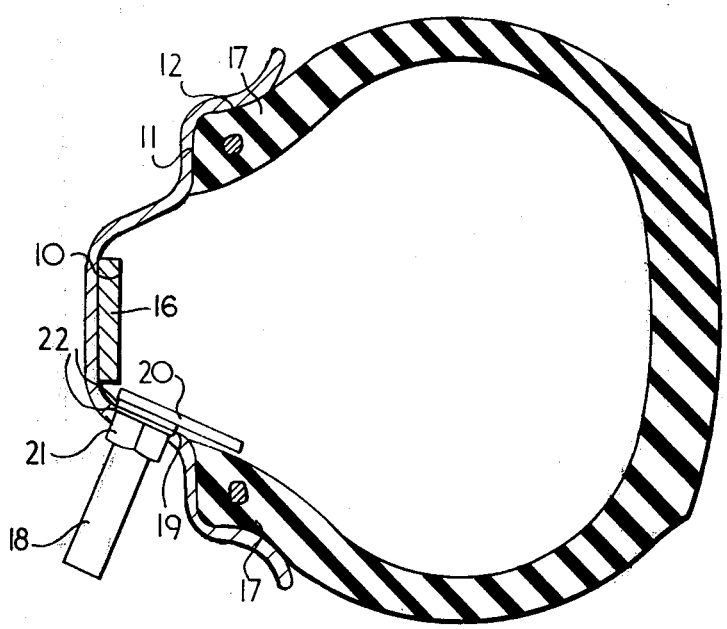
Figure 3:
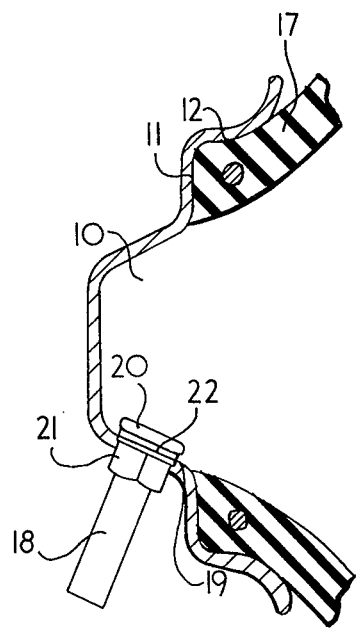
Figure 4:
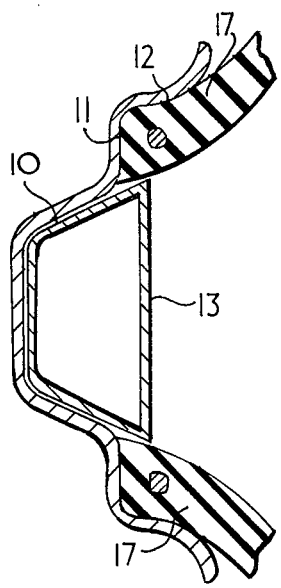

FIG. 2 is a transverse cross section through part of the wheel rim and tire on line 2—2 of FIG. 1 showing the bead region of a tire on the rim and the bead lock and inflation valve in more detail with the lock in the raised position, FIG. 3 is a similar view to FIG. 2 except that the bead lock is in the tire fitting position, FIG. 4 is a transverse cross section through part of the wheel rim on line 4—4 on FIG. 1 showing the sectional profile of the lubricant container.

Figure 5:
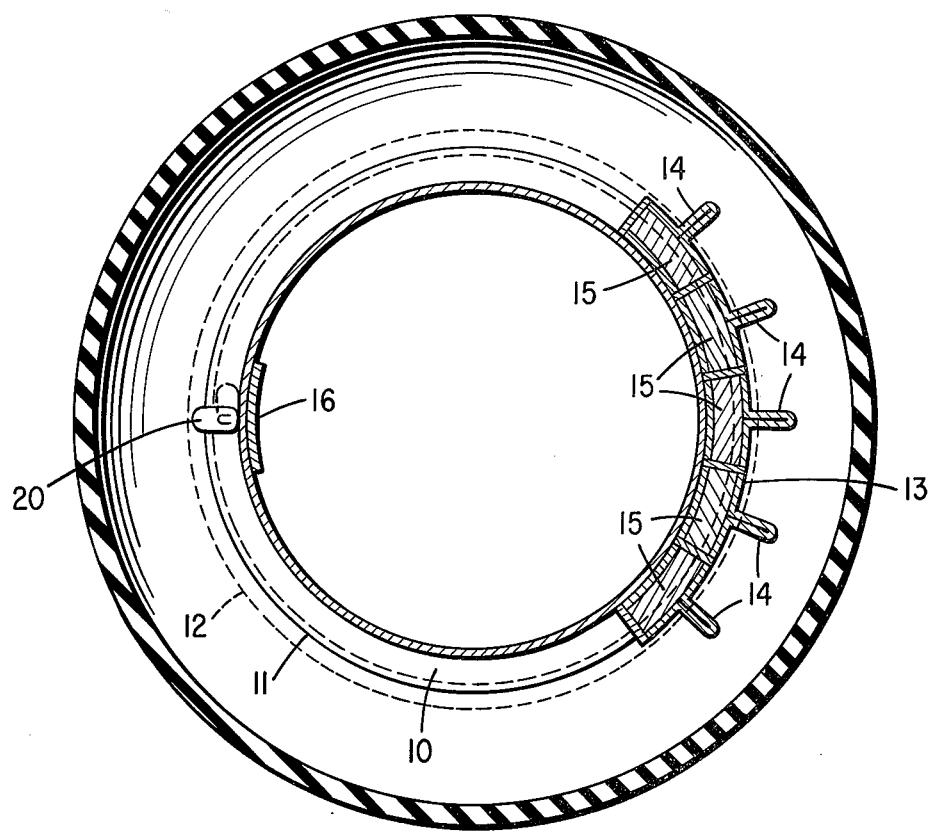

FIG. 5 is a sectional view similar to FIG. 1 showing a plurality of containers for lubricant.

As shown in FIG. 1 the wheel rim comprises a well 10, bead seat 11 and rim flange 12. A lubricant container 13 is located in the well 10 of the rim, the container 13 having an arcuate form, occupying less than ⅓ of the well 10 of the rim, and being made of sheet metal or rigid plastics material.

A frangible projection 14 is provided on the container means to permit release of the contents on deflation of a tire mounted on the rim.

It will be appreciated that this may readily be replaced by a valve or plunger arrangement to serve the same purpose.

The lubricant container 13 and lubricant 15 therein are counterbalanced on the wheel by a suitable weight 16 shown in FIG. 1 on the radially inward side of the rim well diametrically opposite the container 13. Thus, in use, when the lubricant 15 is released from the container 13 and dispersed around the tire the wheel becomes out of balance by an amount approximately equal to the mass of the lubricant. Vibrations will thus be produced in running which will warn the driver of the vehicle on which the assembly is being used that one or more of the tires is in an abnormal condition and the lubricant has been released.

In sectional profile (see FIG. 4) the lubricant container 13 is shaped to fit the rim well and extend radially outwardly beyond, for example ¼" beyond, the level of the bead seats 11 to prevent the beads 17 of a tire mounted on the rim being displaced into the rim well.

The bead locking nature of the container may not be sufficient to prevent the beads from being displaced from their seats around the whole rim circumference. The inflation valve 18 mounted in the wall 19 of the rim well 10 is therefore attached to a short metal or plastics tongue which lies parallel to the wall 19 and is movable between a raised position (FIG. 2) and a tire fitting position (FIG. 3) by rotating the inflation valve through 90°. The inflation valve 18 is held in position by a nut 21 on the stem of the valve tightened against the base of the valve and the tongue 20 to trap sealing washers 22 and the wall 19 in an airtight joint. The inflation valve 18 may thus be rotated simply by slackening the nut 21 and the nut is then retightened to re-make the airtight joint. It will be appreciated that in this case apart from the container 13 a single bead lock is provided for the outboard bead seat. Similar bead locks may be provided for both bead seats and more than one may be provided for each seat, the further bead locks not being associated with an inflation valve stem, the latter being replaced by a simple bolt.

The invention is not restricted to the details of the foregoing examples. For instance the wheel rims may be formed without a well and the lubricant container mounted on the rim. In such a case the wheel may have a split rim to permit removal of the tire or, alternatively, the tire and wheel may form a permanent assembly in which the rim is swaged over the tire beads after the tire has been mounted on the rim.

The lubricant within the enclosing means may be of liquid form, as described in the assignee's U.S. Patent No. 3,738,829 issued June 19, 1973 or, in some cases a solid lubricant such as powdered graphite or French Chalk may be used.

The present invention may be used in conjunction with the inventions of the assignee's U.S. patent Applications Nos. 150,562 now abandoned; 150,628 now abandoned; 150,561 now abandoned; and 150,564 now U.S. Pat. No. 3,814,161 all of June 7, 1971 and which relates to pneumatic tire and wheel assemblies intended to be run with the tire in a deflated condition.

Having now described my invention, what I claim is:

1. A wheel comprising a well-base rim having positioned in said well at least one container for lubricating material provided with means for releasing the lubricating material, the container being located within an arc of the circumference of the wheel no greater than one third of the total circumference, the remainder of the well being sufficient to allow an associated tire to be fitted with said at least one container in position within the well and at least one tire bead retaining member for maintaining an associated tire bead in position against the flange of the wheel rim.

2. A wheel as claimed in claim 1 in which the container is formed integrally with the wheel and provided with replaceable means for releasing the lubricating material.

3. A wheel as claimed in claim 1 in which the means for releasing the lubricating material includes a frangible closure member in the container which is ruptured to release the lubricating material.

4. A wheel as claimed in claim 1 in which the container has an arcuate form in longitudinal section.

5. A wheel as claimed in claim 4 in which the inner curvature of the container matches the external curvature of the base of the well.

6. A wheel as claimed in claim 1 comprising a plurality of containers located within an arc of the circumference of the wheel less than one third of the total circumference of the wheel.

7. A wheel as claimed in claim 1 including a counterbalancing mass for the mass of the container and the lubricating material.

8. A wheel as claimed in claim 1 in which the tire bead retaining member is located diametrically opposite the enclosing means to maintain at least the laterally outer bead in position against a flange of the wheel rim.

9. A wheel as claimed in claim 1 in which the tire bead retaining member comprising a tongue movable between a tire fitting position which permits mounting of a tire on the wheel and a tire bead engaging position in which it maintains the tire bead in position against a flange of the wheel rim after the tire has been mounted on the wheel.

10. A pneumatic tire and wheel assembly capable of being run in a deflated condition comprising a wheel rim, a tire mounted on the wheel rim to define an inflation chamber, means for preventing the tire from being dislodged from the wheel rim when being run deflated, an enclosing means for lubricating material for the interior surfaces of the tire located in one circumferential sector of the tire, said enclosing means releasing lubricating material onto the interior surfaces of the tire when the assembly is used with the tire deflated to facilitate relative movement between contacting interior surfaces of the tire, and a counter-balancing mass located in an opposing circumferential sector which counter-balances the mass of the enclosing means and lubricating material in the assembly whereby on release of the lubricating material from the enclosing means the assembly becomes out of balance.

11. A pneumatic tire and wheel rim assembly as claimed in claim 10 in which the enclosing means has a frangible closure member which is ruptured to effect release of the lubricating material.

12. A pneumatic tire and wheel assembly as claimed in claim 10 in which the rim of the wheel has a well in which the enclosing means is located.

13. A pneumatic tire and wheel assembly as claimed in claim 12 in which the enclosing means comprises at least one container having an arcuate form in longitudinal section and dimensioned in cross section to fit into the well.

14. A pneumatic tire and wheel assembly as claimed in claim 13 in which the radially inner curvature of the container matches the external curvature of the base of the well.

15. A pneumatic tire and wheel assembly as claimed in claim 13 comprising a single container whose length is less than one third of the circumference of a circle having a radius corresponding to the radius of curvature of the radially inner arcuate surface of the container.

16. A pneumatic tire and wheel rim assembly as claimed in claim 13 comprising a plurality of containers located within an arc of the circumference of the wheel less than one third of the total circumference of the wheel.

17. A pneumatic tire and wheel rim assembly as claimed in claim 13 in which at least one container is formed integrally with the well of the wheel rim and provided with a replaceable lubricant release means.

18. A pneumatic tire and wheel rim assembly as claimed in claim 13 in which the means for preventing the tire from being dislodged from the wheel rim comprises a portion of at least one container extending radially outwardly beyond the well of the wheel rim to act as a spacer to prevent the tire beads from being displaced axially inwardly into the well.

19. A pneumatic tire and wheel rim assembly as claimed in claim 10 in which the means for preventing the tire from being dislodged from the wheel rim when being run deflated comprises at least one tire bead retaining member for maintaining a tire bead in position against a flange of the wheel rim.

20. A pneumatic tire and wheel rim assembly as claimed in claim 19 in which the tire bead retaining member is located diametrically opposite the enclosing means to maintain at least the laterally outer bead in position against a flange of the wheel rim.

21. A pneumatic tire and wheel rim assembly as claimed in claim 19 in which the tire bead retaining member comprises a tongue movable between a tire fitting position which permits mounting of a tire on the wheel rim and a tire bead engaging position in which it maintains the tire bead in position against a flange of the wheel rim after the tire has been mounted on the wheel rim.

* * * * *